(12) United States Patent
Stam

(10) Patent No.: US 7,813,903 B2
(45) Date of Patent: Oct. 12, 2010

(54) FIXED TIME STEP DYNAMICAL SOLVER FOR INTERACTING PARTICLE SYSTEMS

(75) Inventor: Jos Stam, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1318 days.

(21) Appl. No.: 11/104,607

(22) Filed: Apr. 13, 2005

(65) Prior Publication Data
US 2006/0235659 A1 Oct. 19, 2006

(51) Int. Cl.
*G06F 17/10* (2006.01)
(52) U.S. Cl. ........................................... 703/2; 345/474
(58) Field of Classification Search .................... 703/2, 703/22, 6; 345/473, 474
See application file for complete search history.

(56) References Cited

U.S. PATENT DOCUMENTS

| | | | | |
|---|---|---|---|---|
| 6,657,629 | B2 * | 12/2003 | Baraff et al. ................. | 345/474 |
| 7,091,977 | B2 * | 8/2006 | Jeong et al. .................. | 345/473 |
| 2004/0075662 | A1 * | 4/2004 | Baraff et al. ................. | 345/473 |
| 2005/0052461 | A1 * | 3/2005 | Vassilev et al. .............. | 345/473 |
| 2006/0125830 | A1 * | 6/2006 | Piponi ......................... | 345/473 |

OTHER PUBLICATIONS

Wong et al., W. Multi-Layered Deformable Surfaces for Virtual Clothing, Proceedings of the ACM Symposium on Virtual Reality Software and Technology, Nov. 2004, pp. 24-31.*
Chittaro et al., L. 3D Virtual Clothing: from Garment Design to Web3D Visualization and Simulation, Proceedings of the 8th Int. Conf. on 3D Web Technology, Mar. 2003, pp. 73-84, 204.*
Bridson et al., R. Simulation of Clothing with Folds and Wrinkles, Proceedings of the 2003 ACM SIGGRAPH/Eurographics Symposium on Computer Animation, Jul. 2003, pp. 28-36.*
Baraff et al., D. Untangling Cloth, ACM Transactions on Graphics, ACM SIGGRAPH 2003 Papers, Jul. 2003, pp. 862-870.*
Neal. K. Collision Approximation for Real-Time Cloth Simulation, ACM SIGGRAPH 2004 Posters, Aug. 2004, p. 1.*
U.S. Appl. No. 60/584,805, filed Jun. 2004, Piponi.*
Volino et al.: "Implementing fast cloth stimulation with collision response" Proceedings of the International Conference on Computer Graphics, Jun. 19-24, 2000, Geneva Switzerland: pp. 257-266: ISBN: 0-7695-0643-7: Abstract, p. 257, section 1; p. 262, section 3 to p. 264, section 4 p. 265, all right column.
Bridson et al.: "Robust treatment of collisions, contact and friction for cloth animation" : Proceedings of the 29th Annual International Conference on Computer Graphics and Interactive Techniques, San Antonio, Texas, USA, Jul. 2002: pp. 594-603: ISBN~ISSN: 0730-0301, 1-58113-521-1 p. 594, section 1 to p. 596, section 4; p. 596, section 6 to p. 597, section 7; p. 597, subsection 7.2 to p. 598, subsection 7.3; p. 599. subsection 7.4 to p. 600, section 8; p. 600 right column, section 8, paragraphs 3 and 4.

(Continued)

*Primary Examiner*—Russell Frejd
(74) *Attorney, Agent, or Firm*—Staas & Halsey LLP

(57) ABSTRACT

The present invention is a particle position solver that allows particles to reach an end of a fixed time, time step in an invalid state and which are then pushed toward a valid state. This allows the solver to continue the simulation while the simulation results move toward a valid behavior. Particle collision calculations are simplified by adopting a non-sequential model ignoring some collisions or combining them. The speed of the simulation is also improved by performing some operations outside the solver calculation loop and by using specialized data structures.

29 Claims, 22 Drawing Sheets

OTHER PUBLICATIONS

Baraff et al.: "Large steps in cloth stimulation": Computer Graphics Proceedings, Annual Conference Series, SIGGRAPH 98, 1998 pp. 43-54: Orlando, Jul. 19-24, 1998, ISBN: 0-89791-999-8: Abstract, p. 45, left column, paragraphs 2-5, right column, subsection 2.4: p. 47, left column, second and last two paragraphs; p. 48, first two paragraphs of section 5; p. 50, section 6 to p. 51, section 7.

Oshita et al.: "Real-time cloth simulation with sparse particles and curved faces" Proceedings of the Fourteenth Conference on Computer Animation, Jul. 11, 2001-Aug. 11, 2001, Seoul, South Korea, pp. 220-227: ISBN: 0-7803-7237-9: Abstract, p. 221, section 3 to p. 225, section 5; p. 227, first 6 lines of section 6.

Volino et al.: "Versatile and Efficient Techniques for Simulating Cloth and Other Deformable Objects" Proceedings of the $22^{nd}$ Annual International Conference on Computer Graphics and Interactive Techniques, 1995, pp. 137-144: ACM Press New York, NY, USA, ISBN: 0-89791-701-4 Abstract, p. 138, left column, paragraph 4 to right column, subsection 3.1; p. 139, left column, first three paragraphs; p. 140, left column, subsection 3.5 to p. 142, subsection 4.4; Figures 2,4,8.

International Search Report issued in a corresponding International application issued on Apr. 10, 2007.

United Kingdom Office Action reported on Dec. 2, 2009 in corresponding United Kingdom Patent Application GB0720228.6.

* cited by examiner

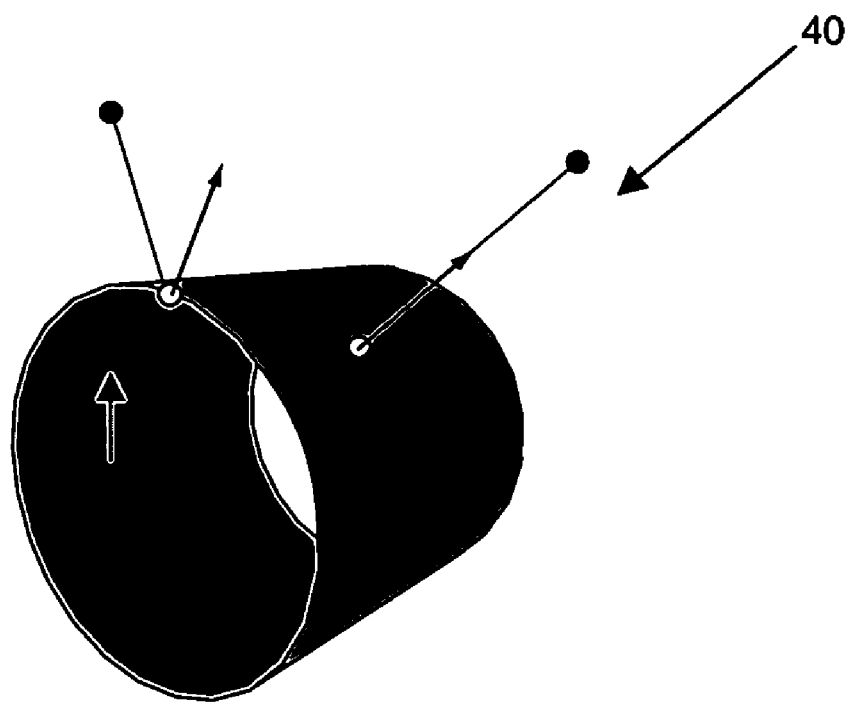
Figure 2
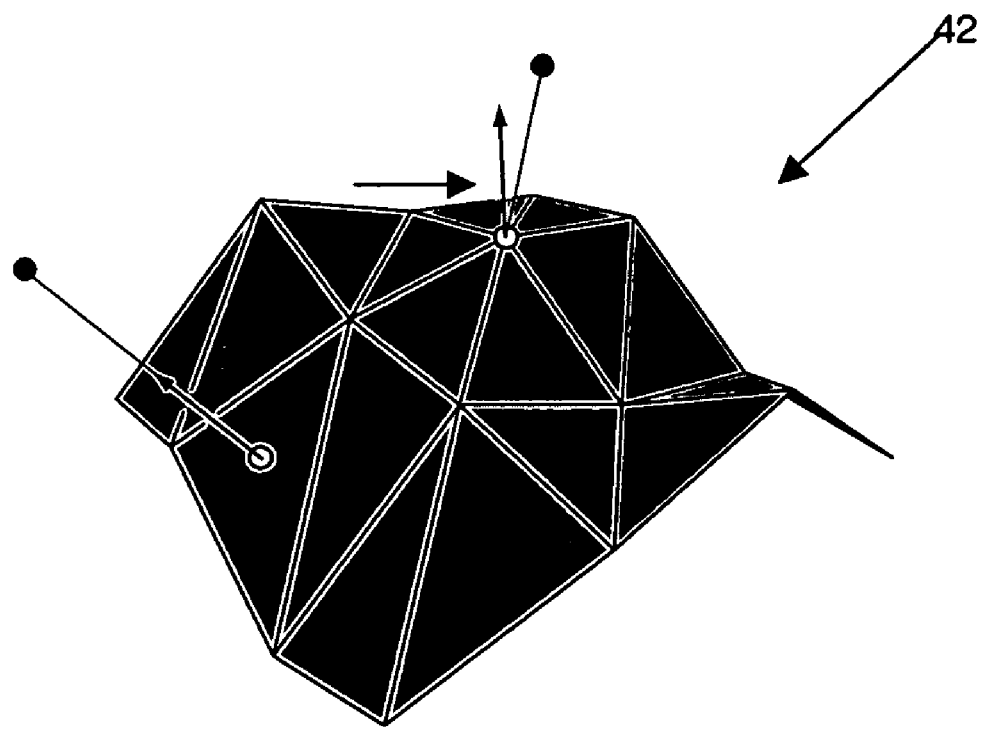

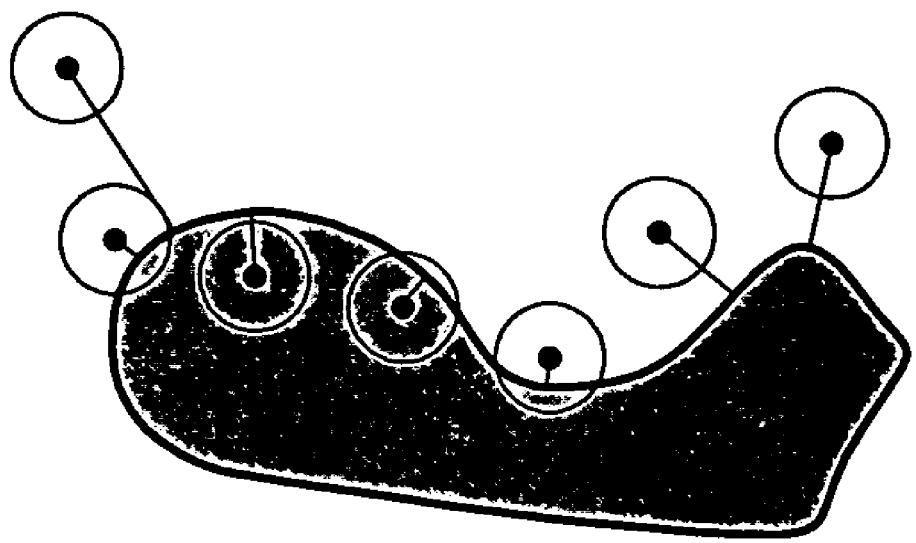
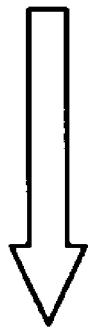
Figure 13
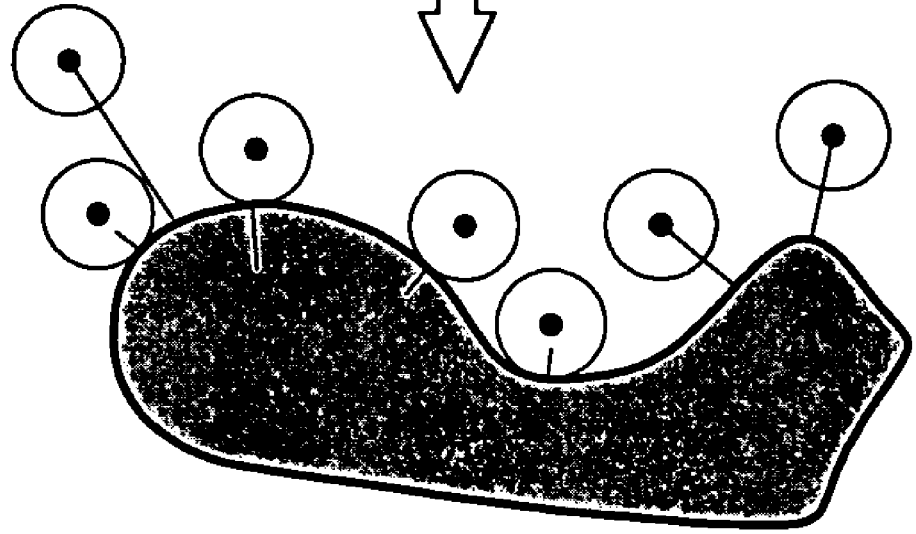

FIXED TIME STEP DYNAMICAL SOLVER FOR INTERACTING PARTICLE SYSTEMS

BACKGROUND OF THE INVENTION

1. Field of the Invention

The present invention is directed to a particle-based solver that continually improves the state of the particle system while it is in an invalid state.

2. Description of the Related Art

Conventional particle systems used in simulation, such as for animation operations, start each particle motion computation step assuming that all of the particles at the start of the step are in valid states. At each step the system iterates on particle positions and velocities until the particles all reach a valid state where particles, edges and surfaces do not overlap. If a conventional system, because of constraints or other factors, reaches a situation where the valid state for all particles cannot be reached, it fails. A failure results, in a "crash" of the simulation where, for example, the system gets in an infinite loop or the simulation behaves in unexpected ways, such as a piece of cloth shriveling to a point. As a result, conventional particle systems can often take a long time to compute the final positions of the particles.

What is needed is a system that does not fail when a particle ends in an invalid state and that performs computations more cost effectively while continually improving the system's state.

BRIEF DESCRIPTION OF THE INVENTION

It is an aspect of the present invention to provide a system that allows a particle to enter invalid state without the simulation failing.

It is another aspect of the present invention to provide a system that simplifies computations for that the simulation is more cost effective.

It is another aspect of the present invention that all constraints on the particle system are treated in the same iteration loop.

It is another aspect of the present invention that any time step is allowed.

It is another aspect of the simulation that different phenomena are treated in a unified framework using constrained particles. For example, the interactions of cloth, rigid bodies and fluids are all treated simultaneously within the same framework.

The above aspects can be attained by a fixed time step particle position solver that allows particles to reach an end of the time step in an invalid state and which are then pushed toward a valid state. This allows the solver to continue the simulation while the simulation results move toward valid behavior. Particle collision calculations are simplified by adopting a non-sequential model. The speed of the simulation is improved by performing some operations outside the solver calculation loop.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 shows normals and closest points.
FIG. 13 depicts surface penetration handling.

DETAILED DESCRIPTION OF THE PREFERRED EMBODIMENTS

Introduction

Figure 1:
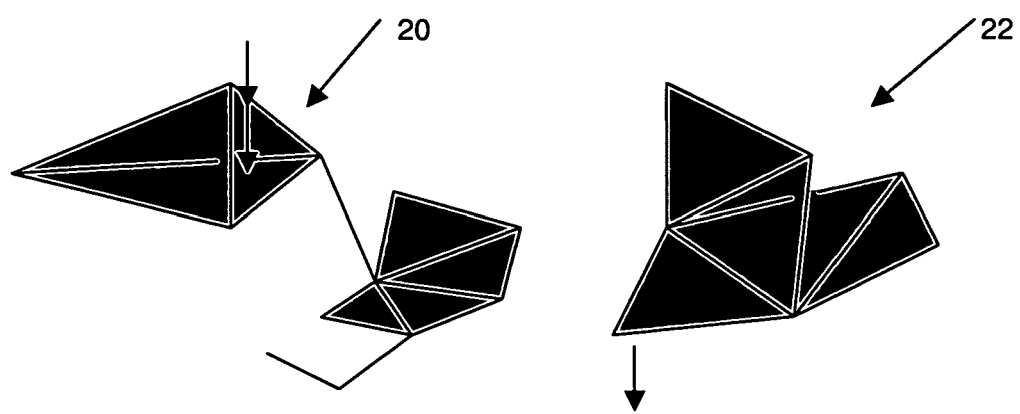
FIG. 1 depicts shapes.

The discussion herein describes a dynamics solver for interacting particles. The purpose of the solver is to compute the dynamics of a wide variety of interacting shapes in a unified framework. The solver is mainly targeted at applications in computer graphics, ranging from special effects in feature movies to real-time simulations in games, but can be used for other purposes such as in early prototyping and testing of a physical system through simulation, even though the simulation might not be accurate enough for a final validation it might help in making early design decisions. These target applications require physically plausible simulations of a wide range of natural phenomena such as liquids, rigid bodies and cloth. Since all these phenomena can potentially interact simultaneously, it is important to handle them in a single framework.

Below is discussed some of the challenges facing a dynamical solver using the example of cloth simulation. At first the motion of a piece of cloth like a ribbon or piece of garment might seem to be fairly straightforward because of its familiarity. However, cloth is an example of a highly self-affecting system. By far the biggest challenge facing a cloth solver is that cloth collides both with itself and the environment. As a consequence, many interactions have to be processed in every step of the simulation. Ideally we do not want the cloth to self-intersect itself or penetrate any objects in the environment. The appearance of cloth is also highly complex due to the appearance of folds and wrinkles. Consequently a cloth solver should be able to handle a very large data set. In particular, the cost (computation time) of the solver should scale nicely with an increase in complexity. This excludes expensive and complicated solvers. Simple and efficient solvers are preferred. Another factor that makes cloth hard to simulate is that it strongly resists stretching. This makes it hard to model the cloth as a system of connected springs for example as stiff springs require expensive solvers to avoid instabilities. Finally, it is important that the solver reproduce the long-term behavior of cloth. For example, a piece of cloth dropped under the influence of gravity alone should come to a perfect rest state. There do not appear to be any cloth solvers that can handle all of these challenges flawlessly. Consequently, today cloth simulation is still an active area of research within the field of computer graphics. The initial motivation behind the invention described herein paper was to build a novel cloth solver. Subsequently, it was realized that the cloth solver could be extended to a larger class of phenomena, such as particles.

One of the main features of the approach described herein is that the system allows the dynamic solver at each time step to return an invalid state, such as the cloth self-intersecting itself or intersecting another body. Instead of trying to guarantee a valid state after each time step of the simulation, the system tries to push the dynamics towards a valid state. The solver gradually improves the state of the cloth over a single time step of the simulation. The solver stops as soon as we compute a valid state of the system or when it has reached a user set time limit on how much time it is allowed to spend improving the state. This approach has several benefits. First, it allows for faster compute times. In some applications it is ok for the simulation to be in an invalid state. For example, in the early stages of the creation of an animation animators are more interested in getting a feel for the general motion of the shapes. Fast feedback at that stage is more important than minor flaws in the appearance of the shapes. Another benefit of this approach is that the solver will not get locked in a situation where all the constraints cannot be met. These situations occur because the environment and forces are not always physically consistent in an animation environment. Lastly, solvers which assume a valid state from the beginning usually fail miserably (at least in common experience) when given an invalid state. In summary: allowing the simulation to "fail" we obtain a solver that is faster, more robust and easier to implement because it allows approximations that would not be acceptable in a system that attempts to always solve a valid state.

Notations

To make the algorithms discussed herein more readable the following notations are adopted. The discussion will use the Arial boldface font for all variables and code statements to differentiate them clearly from the explanatory text. To select particular elements of an array variables that contain a set of indices are used. For example, if I=(0,100,3) then the statement array[I]=0 only sets the entries 0, 100 and 3 of the array to zero. If the index set is a set of consecutive indices between a and b then the notation a.b is used. For example, the following statement array[1 . . . N]+=1, adds one to each element of the array with an index between 1 and N. These notations make many of the algorithms more compact and therefore easier to read. It should be straightforward for one of skill in the art to translate the algorithms into any computer language such as C++.

Basic Structure of the Solver

A shape in the model discussed herein is a collection of particles connected using edges, triangles and tetrahedral. FIG. 1 shows some examples 20 and 22 of shapes built from edges, triangles and tetrahedral that are handled by the dynamical solver. The solver makes no assumptions on how these elements are connected together to form objects and how the objects are handled as this is expected to be handled conventionally. Cloth, for example, is modeled as a triangle mesh and a triangular mesh can be subdivided for a finer resolution image using conventional subdivision methods.

The dynamics of the system are modeled by assigning different properties to the particles which are stored in arrays indexed by a particle index i. The solver lets N be the total number of particles. The dynamics of each particle is modeled by its position pos[i] and velocity vel[i]. Other properties include the inverse mass inv_mass[i] and the thickness radius [i]. In addition the solver requires some additional data associated with each particle, described in more detail below.

The shapes also interact with surfaces that model the environment. A property that is needed is that the surfaces allow the computation of the closest point (or shortest distance) on the surface to any given point in space. Another property needed is a normal at each point to determine on which side of the surface a point lies. Every surface interacting with the shapes should therefore have a function:

closest_point(surf,pos,cp,norm),

This function, which can be provided by one of skill in the art, returns the closest point cp and the normal norm on the surface surf from the position pos.

Simple examples of such surfaces include planes and spheres. A triangular mesh is another important example. In this case the normals at the edges and vertices are defined as the averages of their neighboring face normals. FIG. 2 depicts two examples 40 and 42 of surfaces and their closest points as defined by a function that returns the closest point on its surface for any point in space along with the normal there. Notice that in some cases the normal is not necessarily equal to the normalized direction of the point to the closest point.

Simulations are computed one frame (or time step) at a time. The solver is called for each frame of the simulation and takes as an input the external forces applied to the particles. These are stored in an array called force. The general structure of an animation loop according to the approach discussed herein is as follows:

```
do_initializations ( )
while ( simulating )
    get_forces ( force )
    do_solve ( force )
    do_damping ( )
end
```

The first routine, get_forces (force) (see also 60 of FIG. 3), takes care of quantities needed in the solver that only have to be computed once for the entire simulation. The application that uses this solver is responsible for computing the external forces, such as gravity and air drag. Note, because conventional solvers operate in time sub steps correlated to collisions (as discussed in more detail below), this force input must occur multiple times within a time step in conventional solvers. The result is that the solver described herein is more efficient.

The last routine do_damping( ) adds damping to the velocity of the particles. This step is useful in removing large overshoots due to violent collisions between particles. It is therefore important to call this routine at the end of the simulation step in some situations.

Simulations are usually advanced using a variable time step. To keep the formulas below simple we will assume that this time-step is always equal to 1. The solver can handle other time-steps by scaling some of the quantities accordingly if their units depend on time. This assumption also forces the solver not to rely on small time steps to achieve stability.

Figure 3:
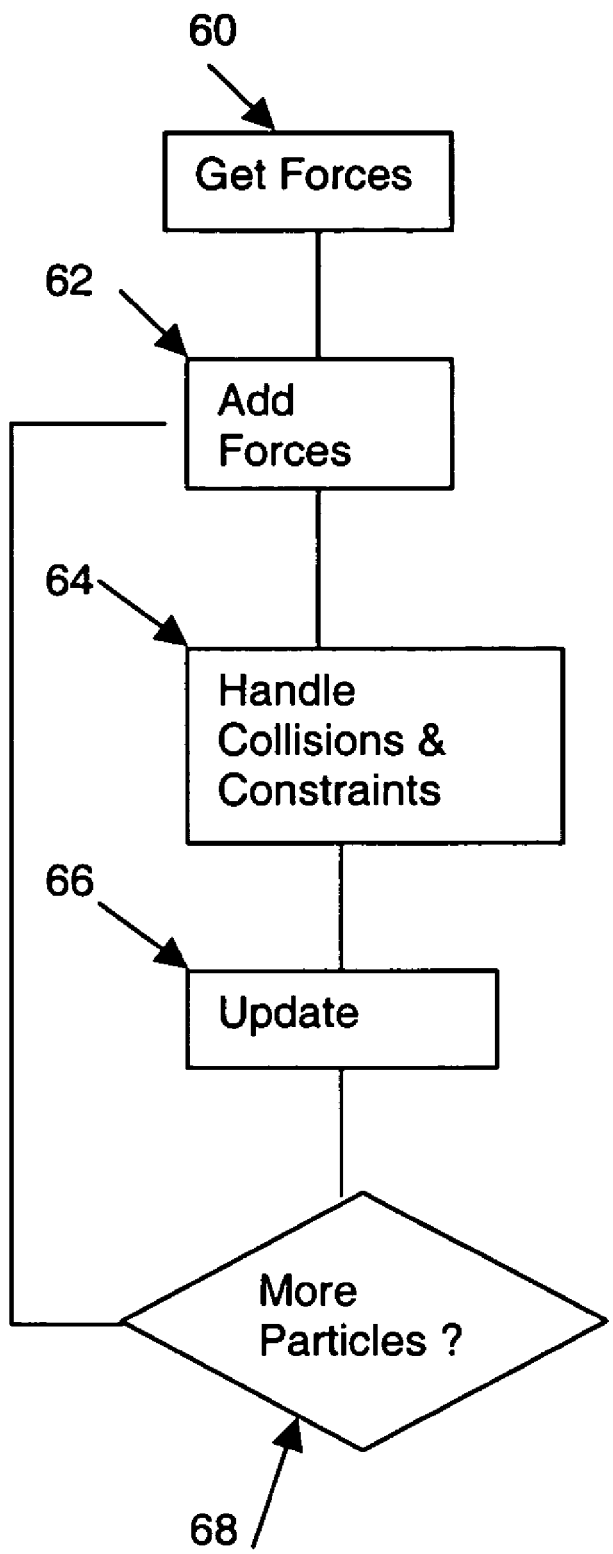
FIG. 3 illustrates a solver process.

The solver has roughly three basic steps. In the first step 62 external forces are added to the velocities, as depicted in FIG. 3. In the second step 64 collisions and constraints are handled by modifying the velocities. Finally, in the third step 66 the positions of the particles are updated using the modified velocities. More precisely:

```
do_solve ( force )
    vel[1 . . . N] += inv_mass[1 . . . N]*force[1 . . . N]
    prev_vel[1 . . . N] = vel[1 . . . N]
    compute_pairs( )
    for it=1 to it_max do
        do_collisions_space_time ( )
        do_constraints ( )
        if nothing happened then break
    end
    pos[1 . . . N] += prev_vel[1 . . . N]
end
```

The forces provided in the force array model external forces, such as gravity and air drag for example. They do not include internal forces due to stiffness and bending for example. Treating them in this manner could result in unstable simulations that produce unbounded results.

A very important step in the algorithm is the loop in the algorithm that resolves collisions and internal forces. Each iteration of this loop attempts to improves the state of the simulation. The operations inside the loop involve two basic steps. In the first step the solver attempts to resolve all the collisions that occur between the shapes over the current simulation step. This involves tracing the path of the elements of the shape through space-time. The second step resolves internal forces such as stretching and bending via soft constraints and resolves penetrations between shapes not resolved by the collision step. The iteration loop terminates when no modifications of the particles occurred ("nothing happened") or when a maximum number it_max is reached. This last parameter let's the application control the maximum time spent in the solver. Typically, this would be set between 5 and 20 iterations.

Figure 4:
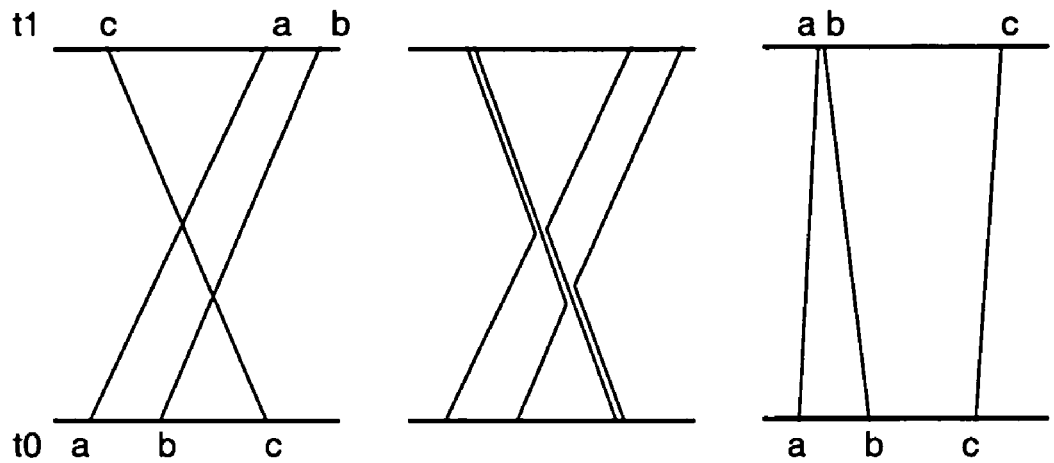
FIG. 4 shows particle paths and resultant positions of the solver.
Figure 5:
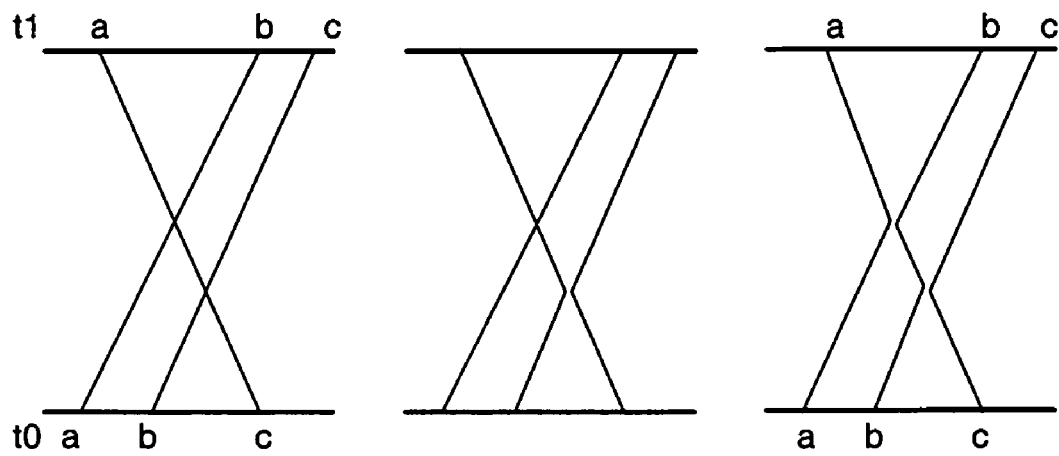
FIG. 5 shows conventional paths and positions.

At this point the approach discussed herein can be contrasted with other conventional simulation strategies. One of the main characteristics of the solver described herein is that the solver advances the simulation using the same time step (equal to 1 in our case). This approach is very different from other conventional solvers that attempt to resolve the collisions more accurately by sub sampling the time step. Especially when the sub steps are based on the time to the first collision. In this conventional case all particles are always advanced to the time of the first collision. The collision is then resolved and the particles are updated again. This process is iterated until there are no more collisions or the end of the time step is reached. A possible problem with this conventional approach is that it can potentially become very costly when there are many collisions. In some cases it can even get stuck when the system cannot resolve a situation involving many simultaneous collisions. In contrast the solver discussed herein need not use sub steps at all. FIGS. 4 and 5 illustrate the difference between the approach discussed herein (FIG. 4) and conventional collision event driven simulations (FIG. 5) for the case of three interacting particles a, b and c. The particles are constrained to lie in the horizontal direction. Time is shown in the vertical direction. Over a time step a particle therefore moves along a continuous path from the bottom to the top. In the approach of the present invention embodiment we resolve all collisions for each particle over time and then combine the results. For example, two "possible" paths are shown for particle c. In the collision event driven approach, on the other hand, the collisions are handled sequentially (a sequential collision model) as shown by the two sub time steps or collision points of FIG. 5, thereby allowing only a single "possible" path for each particle.

Another characteristic of the solver is that we do not have to guarantee a valid state at the end of the iterations. This possibility is illustrated by the final positions of the particles in FIG. 4 where the particles do not end up at positions associated with a sequential collision model. As noted in the introduction this has several benefits.

In the next sections we will describe the various components of the solver in more detail.

Computing Collision Pairs

As previously stated, the shapes are assembled from points, edges, triangles and tetrahedra. When the shapes move the solver needs to compute the interactions between these primitives. In addition, these primitives have a certain thickness assigned to them. Consequently, instead of points we are really dealing with spheres. The thickness may vary for each particle and is stored in a radius array. The thickness at any point on an edge, a triangle or a tetrahedron is computed by interpolating the thickness defined at their vertices.

Figure 6:
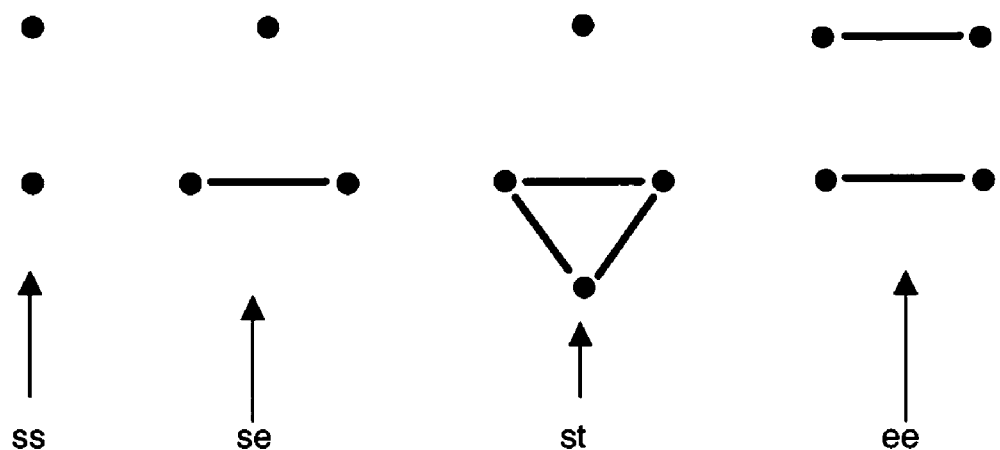
FIG. 6 depicts types of collision pairs.

The possible interactions between the primitives are restricted to the following pairs: sphere/sphere (ss), sphere/edge (se), sphere/triangle (st) and edge/edge (ee). FIG. 6 depicts the different types of pairs considered in the solver. Other interactions such as triangle/triangle can be reduced to a sequence of interactions belong to a combination of the four basic types. For example, to handle the full interaction between two triangles we collide each sphere of the first triangle against the second triangle and vice-versa. In addition we also collide their edges. This results in 6 interactions of type "st" and 9 interactions of type "ee".

At each time step the solver computes the four pair arrays, pair_ss, pair_se, pair_st and pair_ee. Each entry of the pair array is a set of indices. The number of indices for each table and their meaning is as follows.

pair_ss: (i0,j0): interaction of sphere i0 with sphere j0 pair_se: (i0,j0,j1): interaction of sphere 10 with the edge (j0,j1)

pair_st: (i0,j0,j1,j2): interaction of sphere i0 with triangle (j0,j1,j2)

pair_ee: (i0,i1,j0,j1): interaction of edge (i0,i1) with edge (j0,j1)

These four pair arrays are combined into a single pair array.

Figure 7:
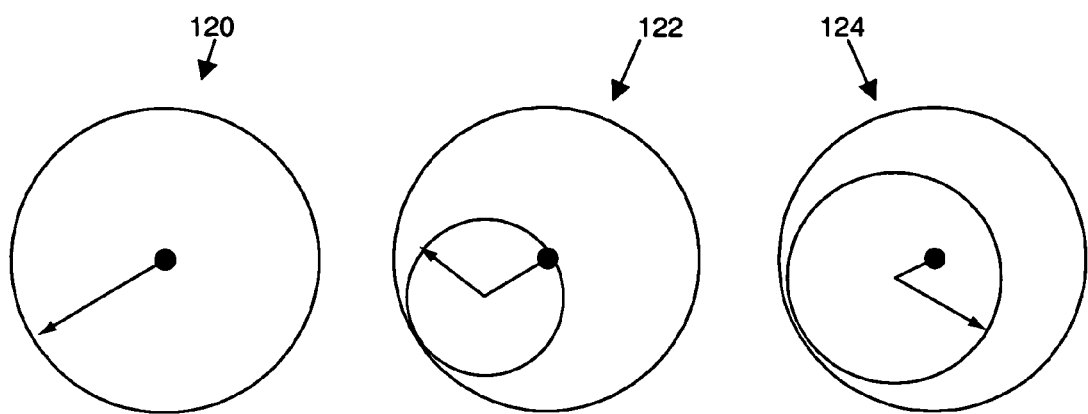
FIG. 7 shows a bounding sphere for various particle paths.

Computing the pair arrays is in general quite costly. Therefore care has to be taken to compute them outside of the iteration loop. This requires the inclusion of all potentially colliding pairs including the ones caused by velocity changes due to collisions. Fortunately, when the masses of the particles are roughly identical a particle can never escape the (bounding) sphere defined by its initial position and initial velocity (and the length of the time step) as shown in FIG. 7. FIG. 7 illustrates the sphere defined by the initial velocity bounds the region a particle can access even after collisions. It particular, FIG. 7 shows a particle 120 that has no collision in the time step and thus travels the farthest from it's initial position, a particle 122 that collides midway through the time step and a particle 124 that collides early in the time step. For pairs involving triangles and edges the solver computes the sphere that bounds their particle's bounding spheres.

Potential colliding pairs are created for each pair of overlapping bounding spheres. A straightforward but expensive way to compute these pairs is to simply compare all bounding spheres. Clearly this approach is too expensive when we have many bounding spheres. Fortunately, this operation can be speeded up using a spatial data structure. Later herein (see the Spatial Data Structures discussion below) is discussed two possible data structures: the hash table and the sphere tree, which can speed up this operation. The solver is not restricted to these data structures, however.

When resolving self-collisions the following problem was encountered. Imagine a shape being in a rest state with no external forces being applied to it. In this case the shape should remain in a rest state. However, if the sum of the radii of two particles is larger than their distance in the rest state they will self-collide and move apart. This results in an undesirable inflation of the shape. To remedy this problem the solver associates a "collision length" to each sphere/sphere collision pair. This length is equal to the minimum of the sum of their radii and the distance between them in their rest state. This ensures that self-collisions will not modify the rest state when no external forces are applied. The collision lengths are stored in an array called coll_length. To speed up the computation of these collision lengths the approach of the solver described herein pre-computes a list of collision neighbors at the beginning of the simulation and also computes their separation in the initial state. Each time that that a pair is added, a check is performed to see if the particles in the pair are neighbors and set the coll_length[k] for this pair accordingly.

All steps described in this operation are computed in the function compute_pairs( ) called just before the iteration loop.

Space-Time Collisions

The first step in the iteration loop is to resolve collisions between the spheres, edges, triangles and surfaces that occur within the time step. To resolve these collisions the solver goes through each potential collision pair and computes the time to collision. If this collision occurs within the time step, the corresponding collision response is computed. In the example of FIG. 4 two collisions can occur for the particle c, c colliding with b and c colliding with a. The solver has two different non-sequential model schemes or embodiments that combine the responses. The first scheme or embodiment preferably sets the final velocity to the collision velocity of the collision with the smallest collision time. In FIG. 4 this would set the final collision velocities for particles b and c as that resulting from the collision with particle between these particles and the collision of particle b with particle a would be ignored. This is the scheme that is shown in FIG. 4. The second scheme preferably computes a time weighted average of the collision velocities. The first method is more responsive and suffers less from artificial damping than the second method. However, the second method is more robust as it takes into account all interactions in a single time step. Which one to use in practice depends on the application and the animator can chose between these schemes as needed. The implementation of this step is as follows:

```
do_collisions_space_time ( )
    pre_collisions ( )
        do_pair_collisions ( )
        do_surface_collisions ( )
    post_collisions ( )
end
```

The functions that handle the collisions between pairs and the surfaces both update the velocities through a common function called update_velocity. This function and the pre_collisions and post_collisions routines depend on the update scheme used. For the first scheme where the solver only considers the first collision the implementation is as follows:

```
pre_collisions ( )
    t_coll[1 ... N] = 1
end
update_velocity ( l, new_vel, t )
    if ( t > t_coll ) return
    vel[l] = new_vel[l]
    t_coll[l] = t
end
post_collisions ( )
    prev_vel[1 ... N] = t_coll[1 ... N]*prev_vel[1 ... N] +
                        (1−t_coll[1 ... N])*vel[1 ... N]
end
```

In the second method where a weighted average of the collision velocities is used, the implementation is as follows:

```
pre_collisions ( )
    w_tot[1 ... N] = 0
    coll_vel[1 ... N] = (0,0,0)
    vel[1 ... N] = (0,0,0)
end
update_velocity ( l, new_vel, t )
    w = weight(t)
    coll_vel[l] += w*(t*prev_vel[l]+(1−t)*new_vel[l])
    vel[l] += w*tmp_vel[l]
    w_tot[l] += w
end
post_collisions ( )
    prev_vel[1 ... N] = coll_vel[1 ... N]/w_tot[1 ... N]
    vel[1 ... N] /= w_tot[1 ... N]
end
```

Usually, the function weight(t)=1−t but it could be any function which depends on the time to collision or some other parameters.

ss: edge
se: triangle
st: tetrahedron
ee: tetrahedron

Figure 8:
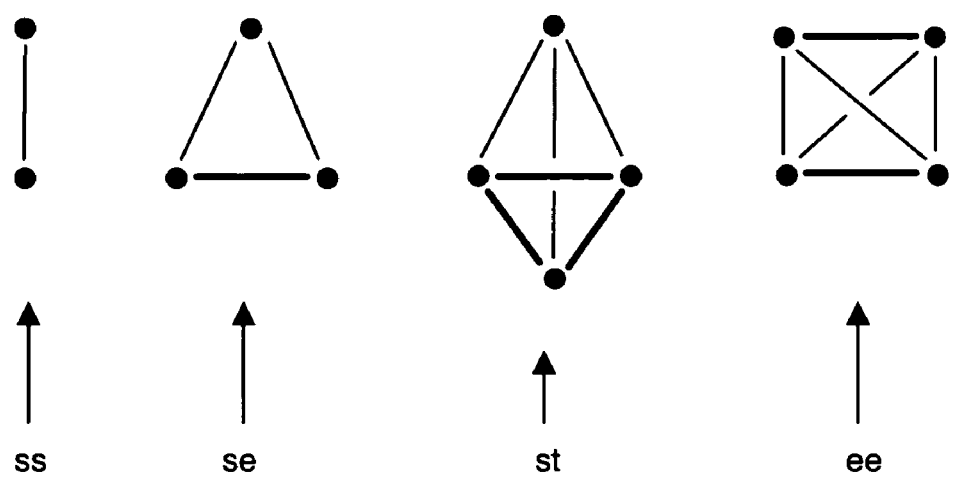
FIG. 8 depicts grouping of collision pairs.

See FIG. 8 for a depiction of pairs grouped into higher dimensional elements. This allows the solver to assign a "signed volume" to each pair. An edge in one-dimensional space has a signed volume defined by the difference of its end points. Similarly a triangle defines a signed area in two-dimensional space using the cross product. Finally, a tetrahedron defines a signed volume in three-dimensional space. In general the volume of the element is defined as the determinant of the matrix whose columns are the points of the element in homogeneous coordinates. More precisely, if the element has n points $P_0, P_1, \ldots, P_n$, then the volume is the determinant of the following matrix:

$$\begin{matrix} P_{0,1} & P_{1,1} & \ldots & P_{n,1} \\ P_{0,2} & P_{1,2} & \ldots & P_{n,2} \\ \vdots & \vdots & & \vdots \\ P_{0,n} & P_{1,n} & \ldots & P_{n,n} \\ 1 & 1 & & 1 \end{matrix}$$

Figure 9:
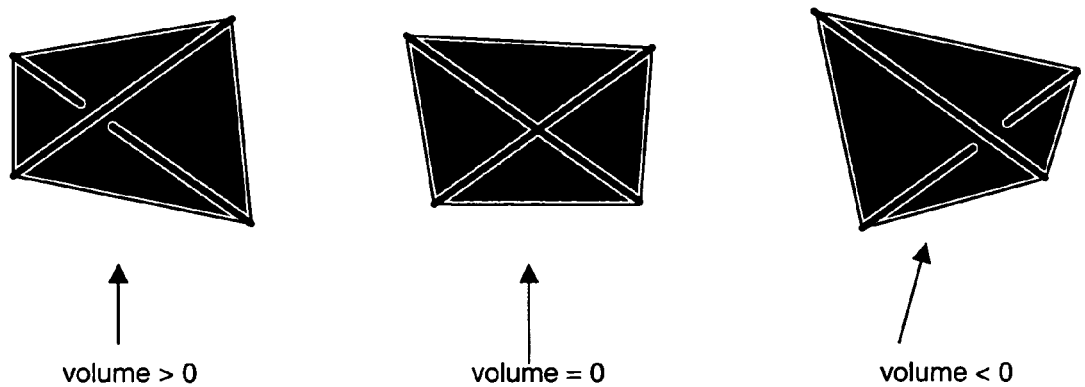
FIG. 9 shows edge collision detection using volume sign reversal.

Let vol(pair) be a function that computes this volume. The usefulness of the volumes comes from the fact that it vanishes when the elements of the pair collide. See FIG. 9 for an illustration of this fact for two colliding edges showing the volume of the tetrahedron reversing sign when the two edges collide and is zero at the instant of collision. This result provides a method to compute the point of intersection for each pair. First compute the volumes at the start and the end of the time step. Then, if there is change in sign the solver can find the time of collision using a simple linear interpolation. This approach works if the elements are infinitely thin. To handle arbitrary thicknesses the solver considers the distance squared between the two elements of the pairs as well. For spheres this is simply the distance squared between their centers. However, for the other interactions the computation is a little bit more involved and discussed later herein (see the Distance between Primitives below). For the purpose of this discussion, we assume that the distance computation is implemented in a function dist2(pair). To find the time of collision, consider the following function instead of the volume alone:

coll_func(pair)=sign(vol(pair))*dist2(pair).

Assume the combined thickness of the elements is equal to thick, the procedure to compute the time of impact is as follows:

```
collision_time ( pair )
    e0 = pos[pair]
    e1 = pos[pair]+prev_vel[pair]
    v0 = coll_func(e0)
    v1 = coll_func(e1)
    if v0*v1 > 0 return −1.0
    t = (thick−v0)/(v1−v0)
end
```

The beauty of this procedure is that it is very simple and works for all four types of pairs. Notice that the approach does not assume that the points involved in the pair travel in straight trajectories during the time step. With this assumption the computation of the collision time in the "se" case would require the solution of a quadratic equation and in the "st" and "ee" cases would require the solution of a cubic equation. This method might seem to be less accurate at first. But assuming a linear path is already an approximation in itself since for any time period a force applied during the time period will cause a particle to travel a curved path. Using an expensive technique to accurately solve an approximation, such as a conventional linear approximation, is overkill.

For the "ss" interaction the solver needs to project the spheres onto a line before the volume formula is used. Instead of choosing a random direction the solver uses or picks the coordinate axis for which the difference between the sphere positions at time 0 is maximum in absolute value. Similarly, for the "se" interaction the solver projects the three points onto the plane whose normal is the maximum coordinate of the normal defined by the three points at time 0. These choices ensure that the solver does not choose a plane for which the volume is zero even though the points are not in contact.

Putting these pieces together we get an implementation of the pair collisions as follows:

```
do_pair_collisions ( )
    for k=1 to n_pairs do
        t = collision time ( pair[k] )
```

```
            if t>=0 and t<=1 then
                collide_pair ( pair[k], new_vel, t )
                update_velocity ( pair[k], new_vel, t )
            end
    end
end
```

The function collide_pair( ) depends on the type of pair and is described in more detail later herein (see the Collision Response discussion below).

To handle the collision with the surfaces the solver computes the penetration depth at the beginning and the end of the time for each particle. If both points are outside the surface, there is nothing that needs to be done. If there is a crossing we find the time of collision and proceed similarly to the pair collisions. The penetration depth is computed from the closest point on surface and the normal direction there:

```
penetration_depth ( pos, radius, p )
    closest_point(surface[p],pos,cpos,norm)
    diff = pos − cpos
    len = length(diff)
    if dot(diff,norm) < 0 then
        return len+radius
    else
        return radius−len
    end
end
```

The penetration depth is negative when there is no penetration. The implementation of the time to contact is then given by:

```
collision_surface ( i, p )
    r = radius[i]
    d0 = penetration_depth(pos[i],r,p)
    d1 = penetration_depth(pos[i]+prev_vel[i],r,p)
    if d0 < 0 and d1 < 0 return −1
    if ( d0 < 0 ) return (−r−d0)/(d1−d0)
    return (r−d0)/(d1−d0)
end
```

These two functions are used to resolve all sphere/sp-surfaces collisions. Here is the implementation:

```
do_surface_collisions( )
    for i=1 to N do
        for p=0 to n_surfaces do
            t = collision_surface(i,p)
            if t>=0 and t<=1 then
                collide surface(i,p,new_vel,t)
                update_velocity(i,new_vel,t)
            end
        end
    end
end
```

For a more detailed description of the collide_surface routine see Collision Response discussion later herein.

Constraints Handling

After performing the space-time collisions the solver needs to resolve any deformation forces due to internal stresses such as stretching and bending. At the same time the solver needs to resolve any penetrations that were not fully resolved in the collision step.

Figure 10:
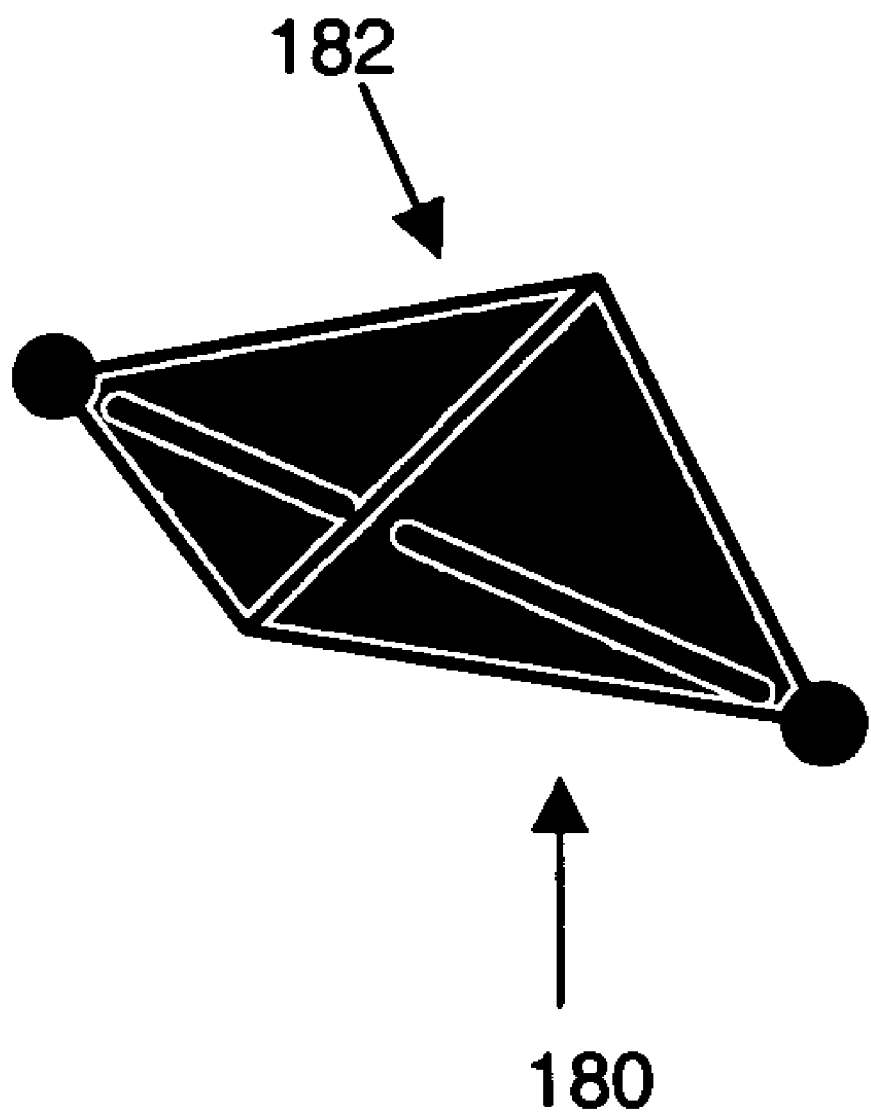
FIG. 10 shows bending being handled by an added link.

The solver first resolves all stretching and bending constraints. Both can be handled using a length constraint alone. To handle stretching, links are created between pairs of particles and with their rest length equal to the length of the link in its rest position. This is similar to an "ss" type interaction. Similarly the solver adds, for each interior edge in a mesh, a link between the two vertices on the faces not shared by the edge. See FIG. 10 for an illustration showing bending effects being handled by adding an additional link 180 that constrains motion for each interior edge 182.

The solver then resolves the stretching and bending forces one link at a time:

```
do_internal_energy ( )
    delta_vel[1 . . . n] = (0,0,0)
    w_tot[1 . . . n] = 0
    for k=1 to n_links do
        i1 = pair[k][1]
        i2 = pair[k][2]
        p1 = pos[i1] + prev_vel[i1]
        p2 = pos[i2] + prev_vel[i2]
        diff = p2 – p1
        len = length(diff)
        dlen = len – rest_length[k]
        tmp_vel = 0.5*dlen*diff /len
        delta_vel[i0] += tmp_vel
        delta_vel[i1] –= tmp_vel
        w_tot[i0] += 1
        w_tot[i1] += 1
    end
    delta_vel[1 . . . n] /= w_tot[1 . . . n]
    prev_vel[1 . . . n] += delta_vel[1 . . . n]
    vel[1 . . . n] += delta_vel[1 . . . n]
end
```

This routine is iterated a number of times so that the changes propagate from one link to the other. Variations on the implementation given above are possible. For example, the particle velocities can be updated directly "in place" without accumulating the changes in delta_vel. This is similar to the different implementation we encountered above for the space-time collisions.

Figure 11A:
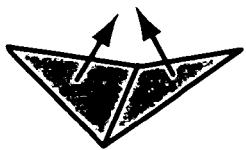
FIGS. 11a-11c show being handled using an angle between normals.
Figure 11B:
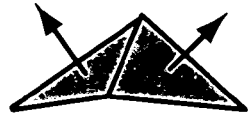
Figure 11C:
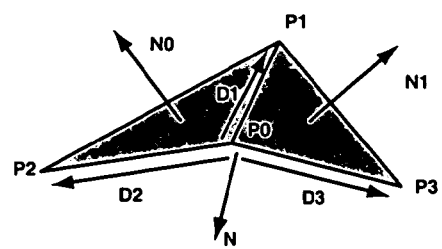

Modeling bending constraints using the cross edge between adjacent faces has the problem that it has two valid states as shown in FIGS. 11a and 11b: the adjacent triangles can flip between one and the other. For these reasons a more accurate model has been developed that constrains the angle between the faces to have a certain value. As shown in FIG. 11c, let P0, P1, P2 and P3 be the points on the two adjacent triangles. First, define the following three vectors D1=P1–P0, D2=P2–P0, D3=P3 P0. From these vectors we can define the normals to the triangles: N0=D1×D2 and N1=D3×D1. We assume that these vectors are all normalized. See FIG. 11c for a depiction of these vectors. The angle between the triangles is equal to angle=as in (dot((N0×N1),D1)). Let angle0 be the rest angle. Next, we wish to displace the four points in such a manner that the angle is equal to the rest angle angle0. In general this is a complicated problem with possibly many solutions. We reduce the complexity of the problem by assuming that each point is restricted only to move along certain directions with a fixed displacement z. One possible choice is to use the following: Q0=P0–z N, Q1=P1–z N, Q2=P2+z N0 and Q3=P3+z N1, where N=(N0+N1)/2 is the vector halfway between the normals (see FIG. 11c). Note that the directions sum up to zero. By varying the displacement z we get a different value for the angle. Our goal is to find a value of z such that the angle is equal to the rest angle angle0, so that the angle between the normals is maintained. A conventional first order approximation that converges to the desired angle is used. Attempting to solve each angle exactly is time consuming since changes made for one triangle pair will affect the result for an adjacent pair.

Figure 12:
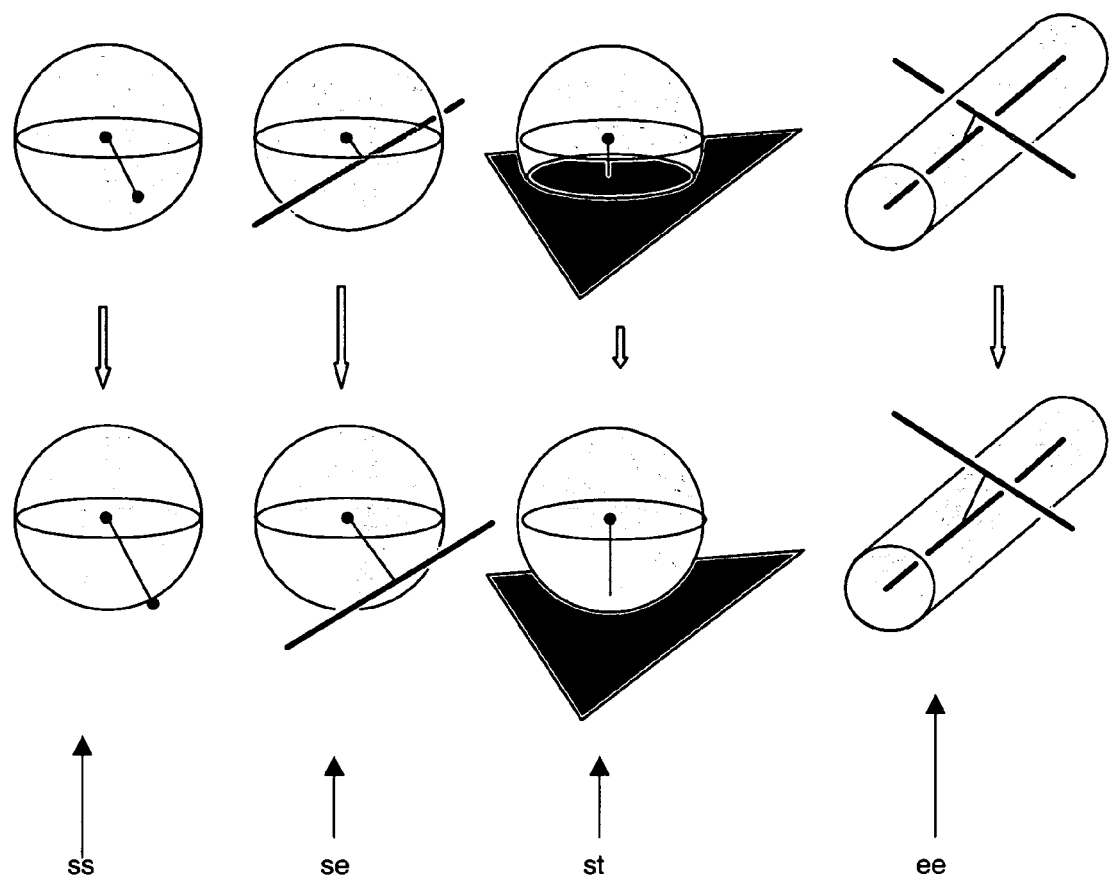
FIG. 12 shows objects being separated based on separation velocities.

To handle the penetration between shapes the solver loops over all interacting pairs and produces velocities (separation velocities) that are added to the resultant collision velocities such that the primitives are separated. This effects the push toward a valid state that improves the simulation. For each pair of elements the solver computes the closest or shortest distance between the elements and checks to see if there is an overlap. If yes, the solver creates a separation velocity along that closest or distance (or valid point) direction that separates the primitives. FIG. 12 illustrates how this is done for all four types of interactions where overlaps between elements are handled by computing separating velocities based on the shortest distance between them. The top row of the examples in FIG. 12 depicts the overlap situation and the bottom row illustrates the "push" that results in the needed separation. In a plane case, when the center of the particle is outside an object the velocity is V=(r–d)D/d where D is the vector between the particle center and the closest point, r is the size of the particle and d is the distance between the particle and the closest point and when the center of the particle is outside the object the velocity is V=(r+d)D/d.

To handle overlaps with surfaces, the solver computes the penetration depth of each particle as discussed above and in the case of an overlap produces a velocity that pushes the particle out of the shape. This procedure is also useful to resolve overlaps with closed triangle meshes as they are surfaces. FIG. 13 depicts how this step works where in penetration handling for a surface each particle is pushed out of the surface along the path to the closest point on the surface.

Spatial Data Structures

To efficiently find the overlapping bounding spheres at least two spatial data structures can be used: a hash table and a sphere tree.

The hash table relies on the idea of partitioning space into uniform cells. The size of the cells is set to the twice the size largest bounding sphere. Each cell stores a list of the bounding spheres that have their centers lying inside the cells. To find the pairs we only have to compare bounding spheres that are in adjacent cells. This results in huge savings in computation time. The problem with this approach is that we a grid that contains the cells. This is where the hash table comes in handy. A hash table is a one-dimensional representation of the three-dimensional grid of cells. A hash function maps each entry (i,j,k) of the grid into an index for the one dimensional hash table. If n_hash is the size of the hash table then one possible hash function that preferably used is:

hash(i,j,k)=((imod p)xor(jmod q)xor(kmod r))mod n_hash where p, q, and r are some large prime numbers. Of course many set of grid indices will be mapped to the same index in the hash table. This means that an entry in the hash table can have bounding spheres from many different grid cells. However, the number of comparisons of bounding spheres is still an order of magnitude faster than the approach with no overhead in memory storage.

One disadvantage of the hash table approach is that it becomes slow when the bounding spheres have widely different sizes. This happens for example when only some of the particles move very fast or when the edge and triangle sizes vary a lot. Therefore, the solver can use in an embodiment another data-structure better adapted to this case: the sphere tree. The idea is very simple. The solver recursively bind pairs of bounding spheres with a larger sphere. This is done until there is only one sphere is left, the root of the sphere tree. The computation of the topology of the tree is done using a hash table for the pairing. This step is somewhat expensive but it only has to be done once for a simulation. To compute pairs the solver recursively checks to see if the sphere bounds a sphere in the tree. If not, the solver can ignore all the spheres children. If yes, the solver continues with the bounding spheres of the children. The position and sizes of the bounding spheres in the tree have to be recomputed at the beginning of every time step. However, this is a fairly straightforward computation where the solver resets the bounding spheres of the leaves and then recursively recomputes the bounding spheres in the remaining nodes of the tree.

Distance between Primitives

To compute the time of collisions and to resolve the penetrations between primitives the solver needs to compute the shortest distance between pairs of them. The case of two spheres is trivial, where the shortest distance is equal to the distance between their centers. The shortest distance between a sphere and an edge is computed by first projecting the center of the sphere onto the infinite line containing the edge. If the point lies within the edge the solver is done, if not, the closest point is one of the end-points. Similarly, the closest point on a triangle to a sphere is obtained by first projecting the point into the plane of the triangle. If the point is inside the triangle, the solver is done. If not, the solver finds the closest on one of the three edges of the triangle. The closest point between two edges is computed by finding the points on the infinite lines such that their difference is perpendicular to both lines. These points are then projected to the closest point on the edge if they lie outside of them.

Collision Response

We first consider the collision response of the particle of velocity vel hitting a plane having a normal equal to norm. The behavior of the collision can be modeled by a bounce parameter and a friction parameter. The implementation is as follows:

```
collide_plane ( vel, norm, new_vel )
    vel_n = dot(vel,norm)*norm
    vel_t = vel – vel_n
    new_vel = friction*vel_t – bounce*vel_n
end
```

Here a very simple friction model is used in practice one can use a more sophisticated one. In the case when the bounce is one and the friction zero, the normal component of the particle's velocity is simply reversed.

The collide_surface routine is almost identical to the collide plane routine since the particle collides with the tangent plane at the point of impact. The implementation is as follows:

```
collide_surface( i, p, new_vel,t )
    pos_coll = pos[i] + t*prev_vel[i]
    closest_point ( surf[p], pos_coll, cp,norm )
    collide_plane ( prev_vel[i], norm, new_vel )
end
```

The pair collisions are treated similarly. First the solver moves the point to the point of intersection. Next, it computes a "normal" norm corresponding to the closest distance between the points determined as discussed above. Since the primitives have a certain thickness this distance is never equal to zero. For edges and triangles the location of the closest point is a linear combination of their vertices. These coordinates are stored in array coord. To make some formulas below simpler we negate the coordinates of the second primitive in the pair. For example, in the case of two spheres we always have that coord[i 0]=1 and coord[i1]=−1 with all the other entries equal to zero. Using this array, the computation of relative velocity simply is:

rel_vel=dot(coord,prev_vel).

Assuming that norm and coord are computed by a routine called comp_pair_data( ). The collision for a pair is as follows:

```
collide_pair ( l, new_vel, t )
    pos_coll[l] = pos[l] + t*prev_vel[l]
    comp_pair_data ( l, norm, coord )
    rel_vel = dot(coord,prev_vel)
    collide_plane ( rel_vel, norm, new_vel0 )
    w_tot = dot(coord,coord)
    new_vel[l] = prev_vel[l] + coord[l]*new_vel0/wtot
end
```

Overall Process

Figure 14:
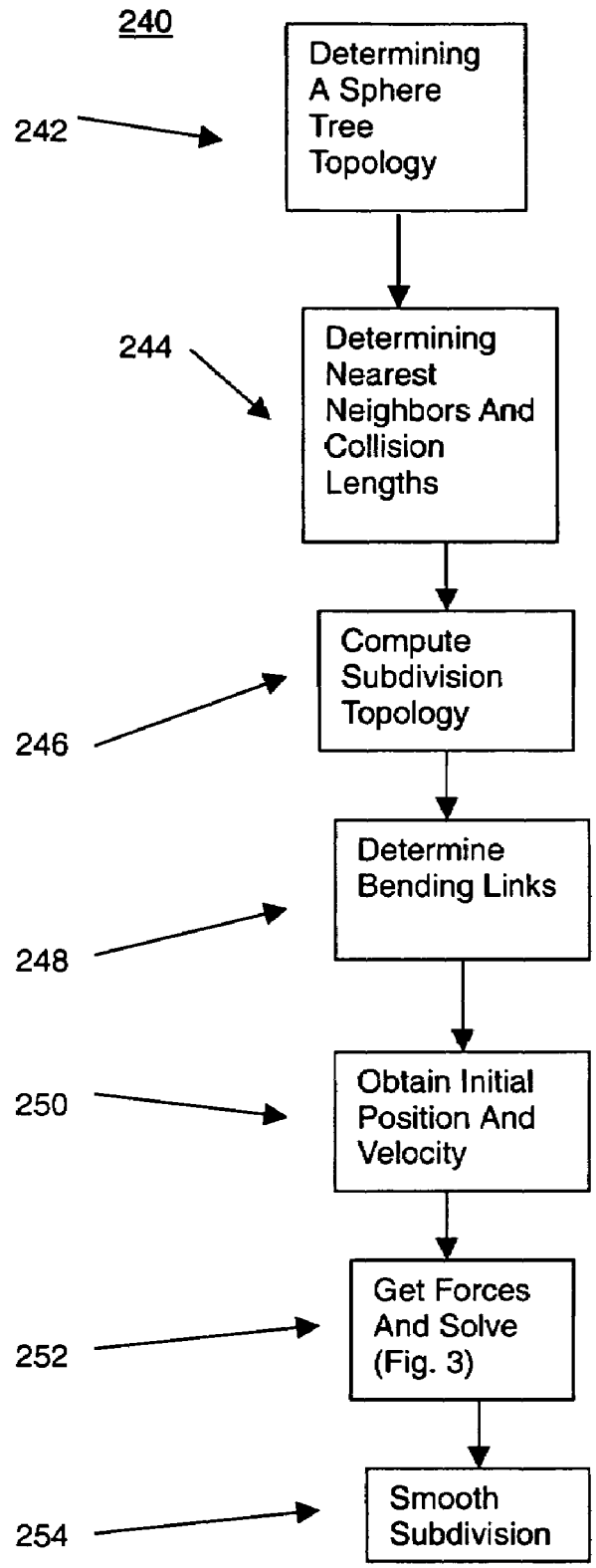
FIG. 14 illustrates the overall process of the present invention.

In a preferred embodiment the overall process 240 (see FIG. 14) of the present invention, as discussed above, includes computing a sphere tree topology 242 and determining 244 nearest neighbors and collision lengths. The system also conventionally computes 246 a subdivision topology. Then, bending links are determined 248. Initial positions and velocities for the particles and elements are obtained 250 and the solver operations are performed 252. Then, it is preferred that a subdivision smoothing operation be performed 254.

Display

Figure 15A:
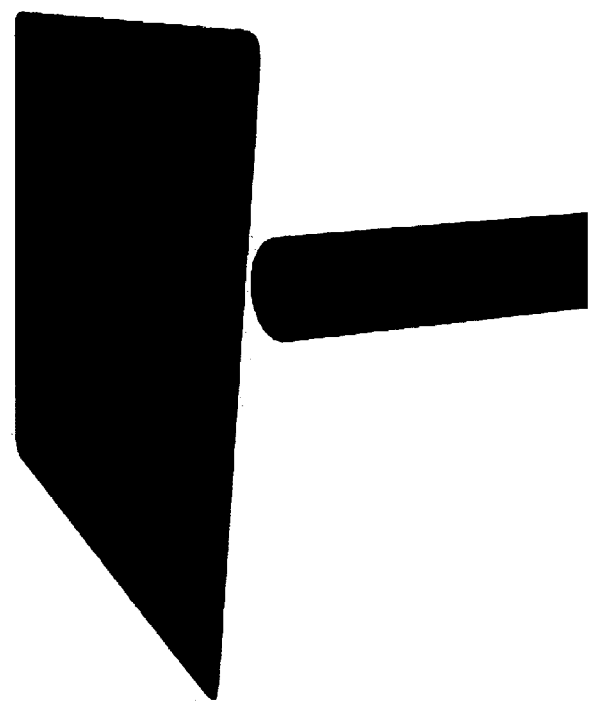
FIGS. 15a-15h depict a display sequence of a particle system passing through an invalid state.
Figure 15B:
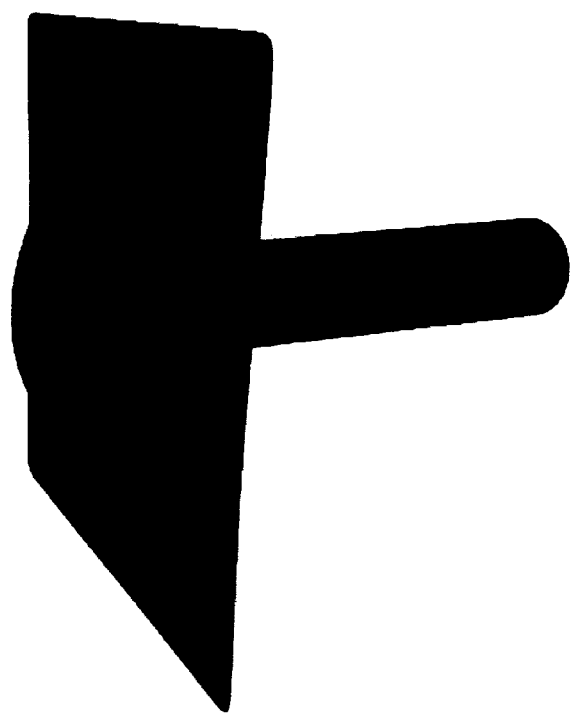
Figure 15C:
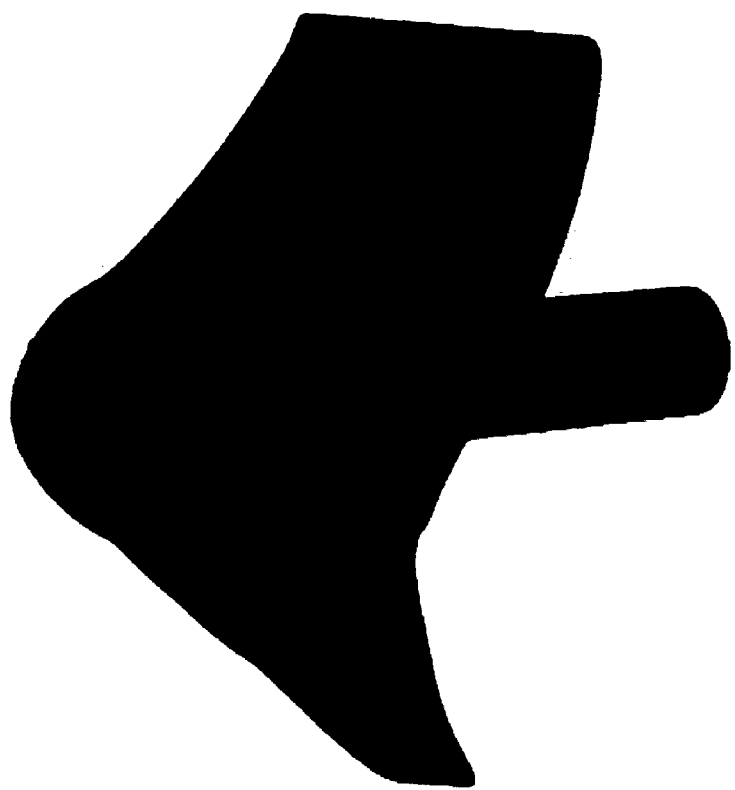
Figure 15D:
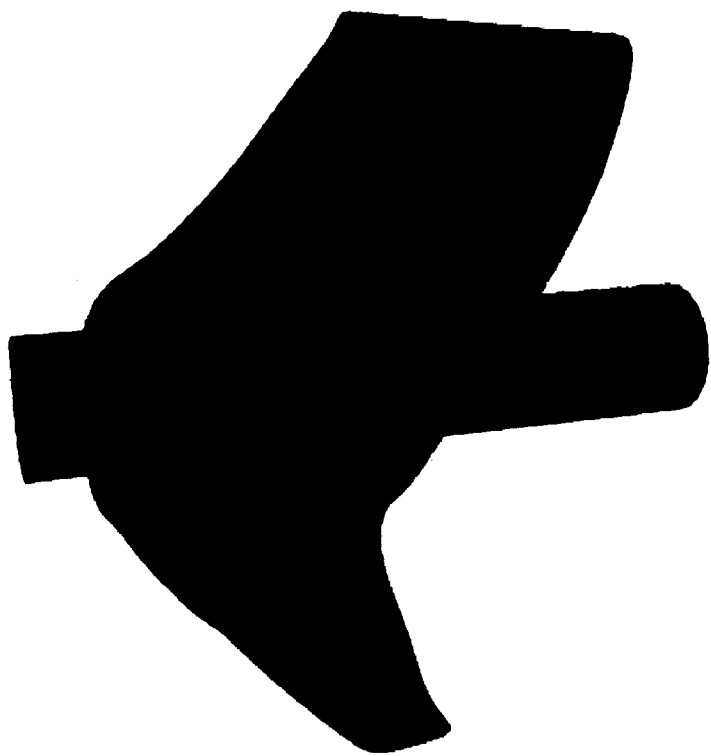
Figure 15E:
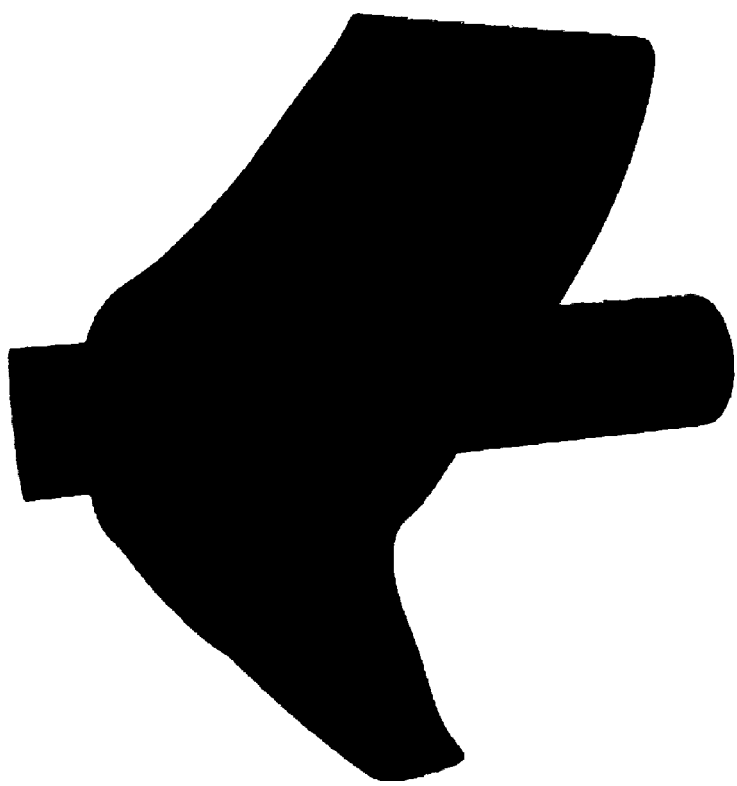
Figure 15F:
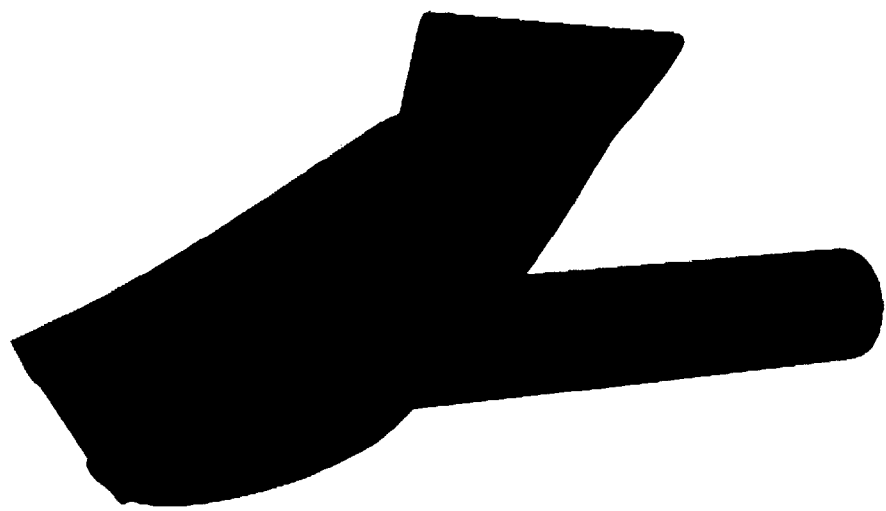
Figure 15G:
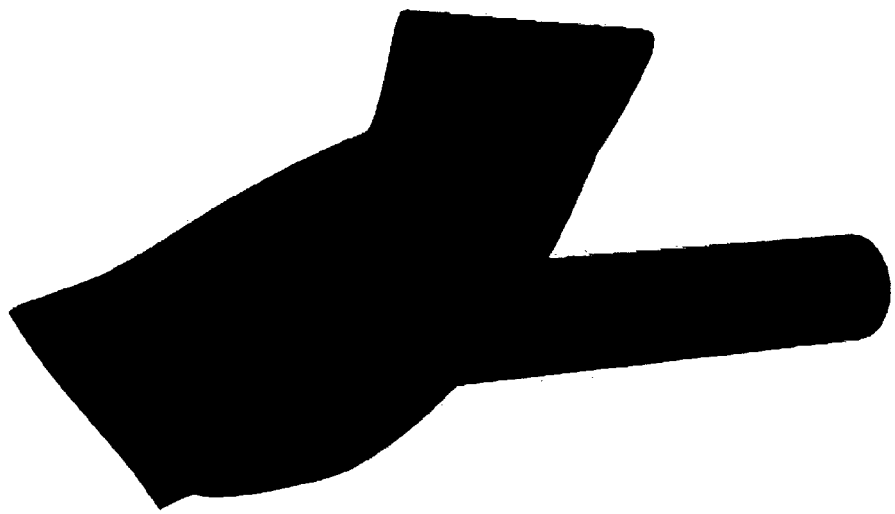
Figure 15H:
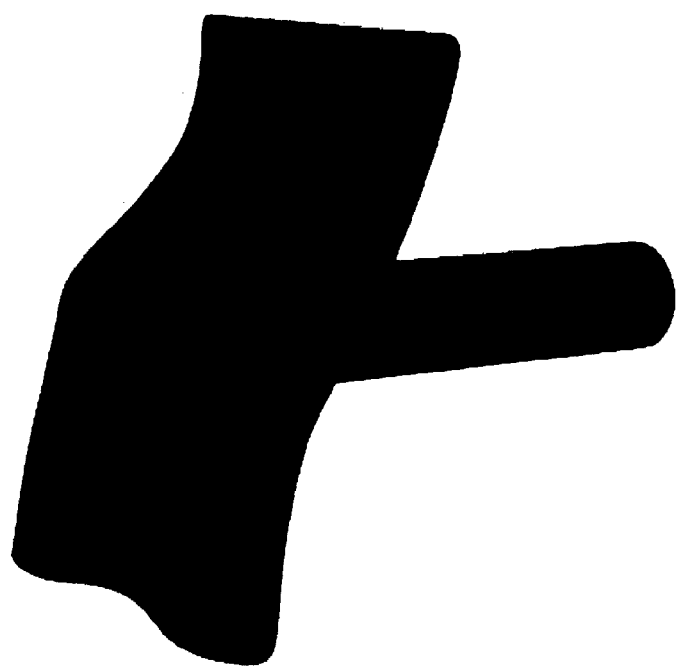
Figure 16:
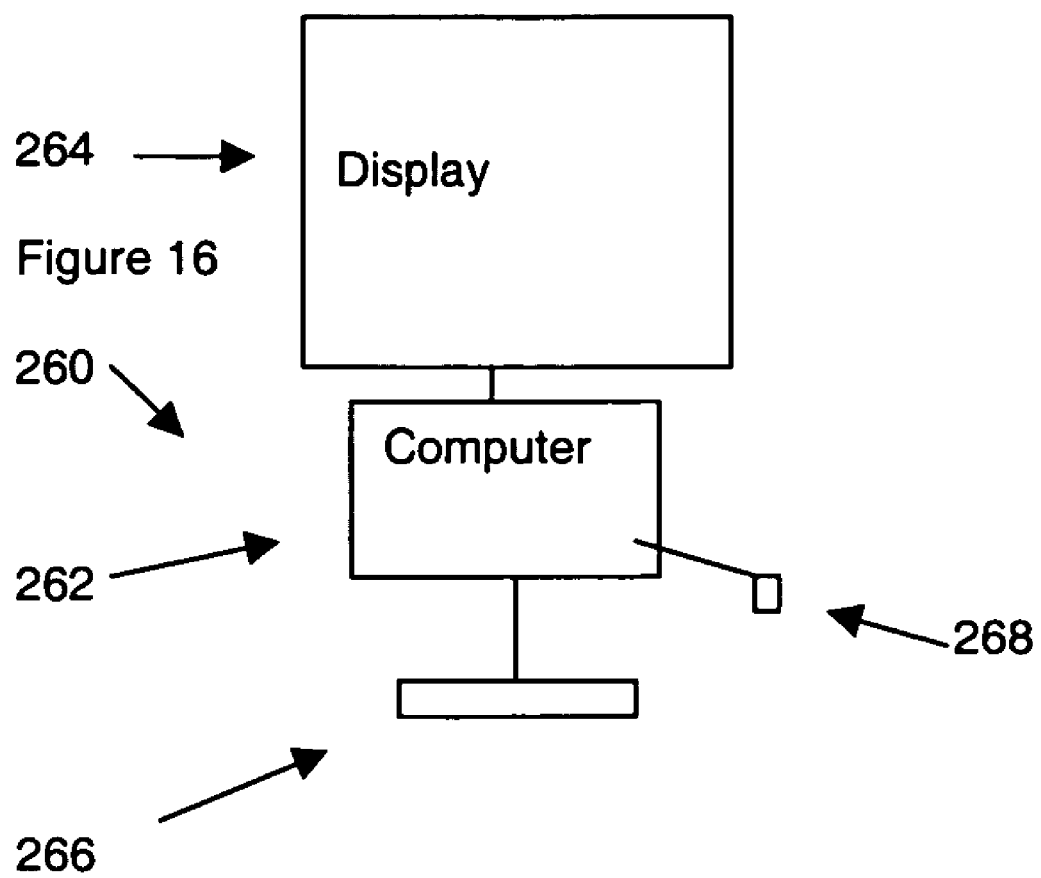
FIG. 16 depicts the hardware of the present invention.

FIGS. 15*a*-15*h* depict a display showing a particle system simulating a rod and a cloth passing through an invalid state and evolving back to a valid state. FIG. 15*a* shows a rod approaching a cloth. FIG. 15*b* shows the rod starting to deform the cloth. FIG. 15*c* illustrates the cloth under high deformation and the rod starting to penetrate the cloth with the cloth beginning to disappear into the rod, an invalid state. The simulation enters an invalid particle state and the simulation does not crash. FIG. 15*d* depicts the cloth having been penetrated but not torn the cloth, an invalid state. The invalid state continues and the simulation does not crash. FIG. 15*e* shows the rod reversing motion and beginning to pull back through the cloth while the simulation is still in an invalid sate and the simulation again has not crashed. FIG. 15*f* shows the pull back continuing. FIG. 15*g* shows the cloth having emerged from the rid and back in a valid state. FIG. 15*h* shows the cloth hanging over the rod in a valid state where the simulation has passed from a valid state to an invalid state to a valid state. Hardware The processes of the present invention discussed herein can be performed on a convention computer system 260, such as depicted in FIG. 16, having a computer 262 with a display 264, keyboard 266 and mouse 268. The system also includes permanent or removable storage, such as magnetic and optical discs, RAM, ROM, etc. on which the process and data structures of the present invention can be stored and distributed. The processes can also be distributed via, for example, downloading over a network such as the Internet.

SUMMARY AND CONCLUSIONS

This discussion has presented a new solver for the simulation of deformable self-affecting shapes. Because of the shear amount of constraints and collisions we opted for an iterative solver that gradually drives the state of the system towards a valid state. This allows the simulation to accept invalid states and makes it more stable. Most of the operations are quite simple and are amenable to a simple implementation of the solver. This is desirable especially when handling large self-affecting systems such as cloth.

The present invention has been described with respect to two schemes for resolving collisions, setting the final velocity to the collision velocity of the collision with the smallest collision time and computing a time weighted average of the collision velocities. Other schemes or embodiments are possible, such as an average of collision velocities not weighted.

The present invention has been described with respect to resolving bending and stretching constraints. Other types of internal energies such as twist for a curve can be implemented in the same spirit.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A particle simulation method, comprising:
   simulating, in a computer, dynamic motion of particles and allowing particle states of the particles to be invalid; and
   adjusting the particle states of the particles toward valid state, wherein the particles when linked together comprise primitives comprising spheres, edges, triangles and surfaces.

2. A method as recited in claim 1, wherein the particles are connected using edges, triangles or tetrahedral or a combination thereof.

3. A method as recited in claim 1, wherein the particles are linked together using edges, triangles or tetrahedra or a combination thereof.

4. A method as recited in claim 1, wherein the particles are linked to represent cloth.

5. A method as recited in claim 1, wherein the simulating simulates a single fixed time step.

6. A method as recited in claim 1, wherein the simulating comprises:
   determining particle collisions; and
   applying constraints to the particles.

7. A method as recited in claim 6, wherein the applying adds a link between non-connected particles linked to a same particle having a rest length.

8. A method as recited in claim 6, wherein the applying computes the angle between triangles adjacent to an edge to enforce a bending constraint.

9. A method as recited in claim 6, wherein an angle is maintained between surface normals.

10. A method as recited in claim 6, wherein the determining comprises:
    computing a signed volume at a beginning and end of a time step; and
    determining a collision has occurred when the sign changes.

11. A method as recited in claim 6, wherein the determining assumes thickness for the particles.

12. A method as recited in claim 6, wherein the determining determines a final velocity of a particle as a collision velocity of a collision with a smallest collision time within a time step.

13. A method as recited in claim 6, wherein the determining determines a final velocity of a particle as a time weighted average of collision velocities of a particle.

14. A method as recited in claim 6, wherein the determining determines a final velocity of a particle using a non-sequential model.

15. A method as recited in claim 1, wherein the adjusting comprises determining a direction and a velocity for moving a particle to a valid state.

16. A method as recited in claim 15, wherein the direction comprises a shortest valid point direction and the velocity comprises a separation velocity that separates the particles.

17. A method as recited in claim 1, wherein the adjusting determines whether particles overlap.

18. A method as recited in claim 1, wherein the invalid state comprises a particle overlapping another particle.

19. A method as recited in claim 1, further comprising determining collision pairs by determining a bounding sphere for each particle and pairing particles with bounding spheres that overlap.

20. A method as recited in claim 19, wherein the collision pairs are computed using a hash table.

21. A method as recited in claim 19, wherein the collision pairs are computed using a sphere tree.

22. A method as recited in claim 19, wherein collision candidates are determined using a collision length equal to the minimum of a sum of particle radii and a distance between the particles a rest state.

23. A particle simulation method, comprising:
    simulating in a computer, dynamic motion of cloth comprising particles linked by triangles and allowing particle state of the particles to be invalid, comprising:
       determining particle collisions comprising:
          computing a signed volume at a beginning and end of a time step;
          determining a collision has occurred when the sign changes; and
          determining a final velocity of a particle as a collision velocity of a collision with a smallest collision time within a time step; and
       applying a bending constraint to the cloth by adding a link between non-connected particles linked to a same particle having a rest length that restrains bending; and
    adjusting the particle state of the particles toward a valid state comprising determining a direction and a velocity for moving a particle to a valid state where the direction comprises a shortest valid point direction and the velocity comprises a separation velocity that separates the particles.

24. A particle simulation method, comprising:
    simulating, in a computer, dynamic motion of particles and displaying a first image of the particles in a valid state;
    simulating dynamic motion of the particles, allowing particle states of the particles to be invalid and displaying a second image of the particles in the invalid state; and simulating dynamic motion of the particles, adjusting the particle state of the particles toward a valid state and displaying a third image of the particles in the valid state, wherein the particles when linked together comprise primitives comprising spheres, edges, triangles and surfaces.

25. A display, comprising:

a first image of particles in a valid state;

a second image of the particles in an invalid state; and a third image of the particles in the valid state, wherein the particles when linked together comprise primitives comprising spheres, edges, triangles and surfaces.

26. An apparatus, comprising:

a computer simulating dynamic motion of particles and allowing particle states of the particles to be invalid and adjusting the particle states of the particles toward a valid state; and a display displaying the simulation, wherein the particles when linked together comprise primitives comprising spheres, edges, triangles and surfaces.

27. An apparatus, comprising:

a computer simulating dynamic motion of particles and allowing particle states of the particles to be invalid and adjusting the particle states of the particles toward a valid state; and a display displaying the simulation, and wherein said display displays a first image of particles in a valid state, a second image of the particles in an invalid state, and a third image of the particles in the valid state, wherein the particles when linked together comprise primitives comprising spheres, edges, triangles and surfaces.

28. A computer readable storage storing a program for a particle simulation process, said program which when executed by a computer causes the computer to perform a process comprising:

simulating, in a computer, dynamic motion of particles and allowing particle states of the particles to be invalid; and adjusting the particle states of the particles toward a valid state, wherein the particles when linked together comprise primitives comprising spheres, edges, triangles and surfaces.

29. A method, comprising:

simulating, in a computer, dynamic motion of particles in a time step;

allowing states of the particles to become invalid in the time step; and adjusting the states of the particles toward a valid state in the time step, wherein the particles when linked together comprise primitives comprising spheres, edges, triangles and surfaces.

* * * * *

UNITED STATES PATENT AND TRADEMARK OFFICE
CERTIFICATE OF CORRECTION

PATENT NO. : 7,813,903 B2  
APPLICATION NO. : 11/104607  
DATED : October 12, 2010  
INVENTOR(S) : Jos Stam Page 1 of 1

It is certified that error appears in the above-identified patent and that said Letters Patent is hereby corrected as shown below:

Column 14, line 11, delete "coord[i 0]" and insert -- coord [i0] --, therefor.

Column 14, line 63, delete "Hardware" and insert the same on Column 15, line 64 as a heading.

Column 15, line 42, in claim 1, after "toward" insert -- a --.

Column 16, line 41, in claim 23, delete "simulating" and insert -- simulating, --, therefor.

Signed and Sealed this
Twenty-eighth Day of December, 2010

David J. Kappos
*Director of the United States Patent and Trademark Office*